United States Patent
Yashima et al.

(10) Patent No.: US 9,328,228 B2
(45) Date of Patent: May 3, 2016

(54) CHLOROPRENE RUBBER COMPOSITION AND ADHESIVE COMPOSITION USING SAID CHLOROPRENE RUBBER COMPOSITION

(71) Applicant: DENKI KAGAKU KOGYO KABUSHIKI KAISHA, Tokyo (JP)

(72) Inventors: Hiroyuki Yashima, Itoigawa (JP); Sachiyo Kishi, Itoigawa (JP); Kunihiko Otsuka, Itoigawa (JP); Yuhei Ishigaki, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 36 days.

(21) Appl. No.: 14/377,779

(22) PCT Filed: Feb. 7, 2013

(86) PCT No.: PCT/JP2013/052823
§ 371 (c)(1),
(2) Date: Aug. 8, 2014

(87) PCT Pub. No.: WO2013/121960
PCT Pub. Date: Aug. 22, 2013

(65) Prior Publication Data
US 2016/0017130 A1    Jan. 21, 2016

(30) Foreign Application Priority Data

Feb. 13, 2012 (JP) .................. 2012-028307

(51) Int. Cl.
| | |
|---|---|
| *C08F 4/00* | (2006.01) |
| *C08F 2/00* | (2006.01) |
| *C08F 236/00* | (2006.01) |
| *C08F 136/00* | (2006.01) |
| *C08L 11/00* | (2006.01) |
| *C08F 36/18* | (2006.01) |
| *C08L 11/02* | (2006.01) |
| *C09J 111/02* | (2006.01) |
| *C09J 151/04* | (2006.01) |
| *C08L 93/04* | (2006.01) |

(52) U.S. Cl.
CPC ................ *C08L 11/00* (2013.01); *C08F 36/18* (2013.01); *C08L 11/02* (2013.01); *C08L 93/04* (2013.01); *C09J 111/02* (2013.01); *C09J 151/04* (2013.01)

(58) Field of Classification Search
CPC ............. C08F 36/18; C08F 2/24; C08L 11/02; C08L 93/04; C09J 111/02; C09J 151/04
USPC .................................. 526/337, 340.1, 233, 90
See application file for complete search history.

(56) References Cited

U.S. PATENT DOCUMENTS

| | | | | |
|---|---|---|---|---|
| 3,988,506 A | * | 10/1976 | Dohi | C08F 236/18 526/219.5 |
| 5,362,780 A | * | 11/1994 | Babler | C08K 5/0091 524/88 |
| 5,625,018 A | * | 4/1997 | Tsutsumi | C08F 36/18 526/201 |
| 6,566,467 B1 | | 5/2003 | Lyons | |
| 2004/0106732 A1 | * | 6/2004 | Tsuji | C08F 293/00 525/94 |

FOREIGN PATENT DOCUMENTS

| | | |
|---|---|---|
| EP | 2 070 955 A1 | 6/2009 |
| JP | 10-81863 A | 3/1998 |
| JP | 10-114802 A | 5/1998 |
| JP | H11-21317 A | 1/1999 |
| JP | 2000-256512 A | 9/2000 |
| JP | 2002-501094 A | 1/2002 |
| JP | 2003-226852 A | 8/2003 |
| JP | 2005-8713 A | 1/2005 |
| JP | 2006-124568 A | 5/2006 |
| JP | 2006-199933 A | 8/2006 |
| JP | 2009-191182 A | 8/2009 |
| WO | WO 99/37696 A1 | 7/1999 |

OTHER PUBLICATIONS

International Search Report mailed Mar. 12, 2013, issued to corresponding International Application No. PCT/JP2013/052823.

* cited by examiner

*Primary Examiner* — William Cheung
(74) *Attorney, Agent, or Firm* — Stein IP, LLC

(57) ABSTRACT

An object of the invention is to provide a chloroprene polymer composition resistant to discoloration under heat or light. Provided is a chloroprene rubber composition, prepared by carrying out emulsion polymerization in the presence of 0.5 to 7.0 parts by mass of a rosin acid salt as emulsifier and terminating the emulsion polymerization by addition of a polymerization inhibitor and a phosphorus- or phenol-based compound as antioxidant. It is possible according to the invention to obtain a chloroprene polymer composition superior in discoloration resistance under heat or light. The chloroprene polymer composition according to the present invention can be used favorably for adhesion of cloths, leathers, foamed sheets, papers, woods, shoe parts, and others.

14 Claims, No Drawings

CHLOROPRENE RUBBER COMPOSITION AND ADHESIVE COMPOSITION USING SAID CHLOROPRENE RUBBER COMPOSITION

CROSS-REFERENCE TO RELATED APPLICATIONS

This application is a national stage of International Application No. PCT/JP2013/052823, filed Feb. 7, 2013, which claims the benefit of Japanese Application No. 2012-028307, filed Feb. 13, 2012, in the Japanese Patent Office. All disclosures of the document(s) named above are incorporated herein by reference.

BACKGROUND OF THE INVENTION

1. Field of the Invention

The present invention relates to a chloroprene rubber composition and an adhesive composition using the same. More specifically, it relates to a chloroprene rubber composition superior in discoloration resistance under heat or light and an adhesive composition prepared using the chloroprene rubber composition.

2. Description of the Related Art

Chloroprene rubbers are materials superior in heat resistance, weather resistance, ozone resistance, chemical resistance, flame resistance (self-extinguishing) and others and have been used in various applications. A typical application among them is adhesive application.

Chloroprene rubber-containing adhesives generally known are those prepared by dissolving a mixture of polychloroprene, adhesive resins, metal oxides, and others in an organic solvent such as toluene or acetone. Such adhesives are superior in initial adhesive strength and others and have been used in various applications including shoes, woodworks, furniture, and vehicles (see, for example, Patent Documents 1 and 2).

Although chloroprene rubbers with balanced physical properties have been used in various fields, as described above, they have a disadvantage that they easily discolor to yellow or brown when exposed to heat or light, and in some cases, the disadvantage restricted their use, depending on the application.

There were proposed methods for improving the discoloration resistance of chloroprene rubbers. For example, Patent Document 3 describes a method of producing a chloroprene rubber, comprising using an alkali-metal salt of disproportionated rosin acid and a water-soluble polymer having sulfonic acid groups and/or sulfate ester groups introduced by addition polymerization and/or addition polymerization and subsequent polymer reaction as dispersants during radical emulsion polymerization in water and adding a radical scavenger and an ultraviolet absorbent thereto at the end of the polymerization.

Patent Document 4 describes a method of using a polymerization inhibitor composition comprising a 4-(C1-C3-alkoxy)phenol and a hindered bis(phenol)methane represented by a particular Chemical Formula, wherein the molar ratio of the alkoxyphenol to the hindered bis(phenol)methane is in the range of 0.5/1 to 2.5/1 during emulsion polymerization of chloroprenes.

CITATION LIST

Patent Literatures

[Patent Document 1] JP-A No. 2003-226852
[Patent Document 2] JP-A No. 2005-008713
[Patent Document 3] JP-A No. H11-21317
[Patent Document 4] JP-T No. 2002-501094

SUMMARY OF THE INVENTION

Technical Problem

Additional aspects and/or advantages of the invention will be set forth in part in the description which follows and, in part, will be obvious from the description, or may be learned by practice of the invention.

As described above, although development for the method of improving the discoloration resistance of chloroprene rubbers is in progress, many of the conventional methods are still insufficient and there exists a need for further development of the technology.

Accordingly, it is an object of the present invention to provide a chloroprene rubber composition resistant to discoloration even when exposed to heat or light and an adhesive composition prepared using the same.

Solution to Problem

The inventors have conducted studies, focusing on the emulsifier used in emulsion polymerization and the antioxidant added together with a polymerization inhibitor when the emulsion polymerization is terminated and found that it is possible to improve the discoloration resistance of chloroprene rubber compositions under heat or light by using a particular emulsifier and an antioxidant and made the present invention.

Specifically, the present invention relates to a chloroprene rubber composition prepared by carrying out emulsion polymerization of a total 100 parts by mass of monomers at least containing chloroprene in the presence of 0.5 to 7.0 parts by mass of a rosin acid salt as emulsifier and terminating the emulsion polymerization by addition of a polymerization inhibitor and a phosphorus- or phenol-based compound as antioxidant.

The phosphorus-based compound used may be at least one phosphorus compound selected from 2,2'-methylenebis(4,6-di-butylphenyl)octyl phosphite, 3,9-bis(2,6-di-tert-butyl-4-methylphenoxy)-2,4,8,10-tetraoxa-3,9-diphosphaspiro[5.5]undecane, tris(2,4-di-tertbutylphenyl)phosphite, bis(2,4-di-t-butylphenyl)pentaerythritol diphosphite, and 6-[3-(3-t-butylhydroxy-5-methylphenyl)propoxy]-2,4,8,10-tetra-t-butylbenzo[d, f][1,3,2]-dioxaphosphepin.

The phenol-based compound used may be at least one phenol-based compound selected from 2,2'-methylenebis(4-ethyl-6-tert-butylphenol), 2,2'-methylenebis(4-methyl-6 tert-butylphenol), pentaerythritol tetrakis[3-(3,5-di-t-butyl-4-hydroxyphenyl) propionate)], octadecyl 3-(3,5-di-t-butyl-4-hydroxyphenyl)propionate), ethylenebis(oxyethylene)bis[3-(3,5-t-butyl-4-hydroxy-m-tolyl propionate)], and 2-methyl-4,6-bisoctylthiomethyl-phenol.

These phenol- and phosphorus-based compounds can also be used in combination.

In this case, the content ratio of phenol-based compound: phosphorus-based compound may be adjusted to 0.5 to 5:1.

The chloroprene rubber composition according to the present invention may contain a surfactant having two kinds of hydrophilic anion groups as dispersant when the emulsion polymerization is carried out.

The surfactant for use may be an alkyl sulfosuccinic acid salt and/or a sulfated fatty acid salt.

The chloroprene rubber composition according to the present invention may contain a water-soluble initiator as the polymerization initiator added when the emulsion polymerization is carried out.

In addition, at least one promoter selected from sodium sulfite, potassium sulfite, sodium bisulfite, formamidine-sulfinic acid, potassium pyrosulfite, and sodium hydrosulfite may be used when the emulsion polymerization is carried out.

The rosin acid salt for use in the chloroprene rubber composition according to the present invention may be a rosin acid salt having a Gardner color scale of 4 or less.

Alternatively, it may be a rosin acid salt having a Hazen scale of 200 or less.

The chloroprene rubber composition according to the present invention may contain additionally a benzotriazole-based ultraviolet absorbent as ultraviolet absorbent.

The chloroprene rubber composition according to the present invention may contain additionally a hindered amine-based photostabilizer as photostabilizer.

In the chloroprene rubber composition according to the present invention, the chloroprene rubber above may be, for example, a graft polymer of 2-chloro-1,3-butadiene and an acrylic monomer.

In this case, the acrylic monomer for use may be, for example, methyl methacrylate.

The chloroprene rubber composition according to the present invention can be used favorably in adhesive compositions. Specifically, it is an adhesive composition containing at least the chloroprene rubber composition according to the present invention and an organic solvent.

Advantageous Effects of Invention

It is possible according to the present invention to obtain a chloroprene polymer composition superior in discoloration resistance under heat or light.

DETAILED DESCRIPTION OF THE EMBODIMENTS

Hereinafter, favorable embodiments of the present invention will be described in detail.

<1. Chloroprene Rubber Composition>

The chloroprene rubber composition according to the present invention is a chloroprene rubber composition obtained by carrying out emulsion polymerization of total 100 parts by mass of monomers at least containing chloroprene (1) in the presence of a particular amount of a rosin acid salt (2) as emulsifier and terminating the emulsion polymerization by adding a polymerization inhibitor (3) and a particular phosphorus- or phenol-based compound (4) as antioxidant. The emulsion polymerization is a simple and convenient polymerization method that is carried out in a reaction solvent such as water and gives polychloroprenes superior in the quality as adhesive. The chloroprene rubber composition may contain, as needed, dispersants (5), polymerization initiators (6), promoters (7), chain-transfer agents (8), ultraviolet absorbents (9), photostabilizers (10), neutralizers (11), and others. Hereinafter, each component will be described in detail.

(1) Monomers at least containing Chloroprene

The chloroprene rubber composition according to the present invention is a polymer composition obtained by emulsion polymerization of monomers at least containing 2-chloro-1,3-butadiene (hereinafter, referred to as "chloroprene"). Thus, the chloroprene rubber compositions according to the present invention include both polymer compositions containing a chloroprene homopolymer and polymer compositions containing a copolymer of chloroprene with another monomer copolymerizable with chloroprene.

The other monomer copolymerizable with chloroprene for use in the invention is one or more monomers arbitrarily selected from monomers that can be used in the chloroprene rubber composition. Examples thereof include acrylic acid esters such as methyl acrylate, butyl acrylate, and 2-ethylhexyl acrylate; methacrylic acid esters such as methyl methacrylate, butyl methacrylate, and 2-ethylhexyl methacrylate; hydroxy(meth)acrylates such as 2-hydroxyethyl(meth)acrylate, 2-hydroxymethyl(meth)acrylate, and 2-hydroxypropyl(meth)acrylate; 2,3-dichloro-1,3-butadiene, 1-chloro-1,3-butadiene, butadiene, isoprene, ethylene, styrene, and acrylonitrile.

It is preferable to select an acrylic monomer among them and use it with chloroprene for graft polymerization. The kind of the acrylic monomer is not particularly limited. It is possible to use one or more acrylic monomers copolymerizable with chloroprene, as they are properly selected. In particular in the present invention, methyl methacrylate is used preferably. As methyl methacrylate gives a polymer superior in adhesiveness to synthetic leathers, a chloroprene rubber composition containing it can be used favorably as the adhesive for leathers.

(2) Emulsifier

In the present invention, an emulsifier is added to make the monomers emulsified in the reaction solvent. Characteristically in the present invention, the emulsifier used is a rosin acid salt.

The rosin acid is a monocarboxylic diterpene acid, a substance generally represented by a molecular formula of $C_{20}H_{30}O_2$. The rosin acid isomer that can be used in the present invention is not particularly limited and may be one or more rosin acid isomers arbitrarily selected from those that can be used as an emulsifier for chloroprene rubber compositions. Examples thereof include abietic acid represented by the following General Formula (1), dehydroabietic acid, dihydroabietic acid, pimaric acid, dihydropimaric acid, isopimaric acid, and secodehydroabietic acid.

[C. 1]

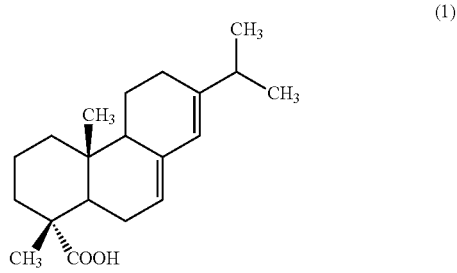

(1)

Fatty acids such as oleic acid and octadecenoic acid may also be included. Pale-colored rosins obtained by disproportionation and/or hydrogenation and subsequent purification of rosin acids can also be used.

The rosin acid salt used as the emulsifier for the chloroprene rubber composition according to the present invention may be an alkali-metal salt, an alkali-earth metal salt, ammonium salt, or the like of the rosin acid. In particular, used of an alkali-metal salt is preferable. The alkali-metal salt is more preferably a sodium or potassium salt from the viewpoint of easiness in handling of the emulsifier.

The physical properties of the rosin acid salt for use in the present invention can be modified by selecting arbitrarily one or more rosin acid salts having physical properties suitable for use in chloroprene rubber compositions. In particular for improvement of discoloration resistance, it is preferable to select a less-colored rosin acid salt. It is preferable to select a rosin acid salt having a Gardner color scale of 4 or less, more preferably 1 or less, as determined, for example, by the method of ASTM D154. It is preferable to select a rosin acid salt having a Hazen scale (also referred to as platinum-cobalt color scale) of white 200 or less, as determined by the method according to ASTM D1209.

In the present invention, rosin acid salt is used as the emulsifier in an amount of 0.5 to 7.0 parts by mass with respect to total 100 parts by mass of the monomers at least containing chloroprene. It is possible to prevent destabilization of the chloroprene latex and deposition thereof in the polymerization reactor when the content is 0.5 parts or more by mass and to reduce discoloration of the chloroprene rubber obtained when it is 7.0 parts or less by mass. In the present invention, the amount of the rosin acid salt added can be modified arbitrarily in the range above. It is more preferable to adjust the addition amount in the range of 1.0 to 5.0 parts by mass with respect to total 100 parts by mass of the monomers at least containing chloroprene.

(3) Polymerization Inhibitor

In the present invention, a polymerization inhibitor is added to terminate the polymerization reaction when the polymerization reaction of the monomers at least containing chloroprene reached a desired polymerization rate. The polymerization inhibitor used in the present invention, may be one or more polymerization inhibitors arbitrarily selected from those having physical properties that can be used in the chloroprene rubber composition. Examples of the polymerization inhibitors include thiodiphenylamine, diethylhydroxylamine, hydroquinone, phenothiazine, p-t-butylcatechol, 1,3,5-trihydroxybenzene, hydroquinone methyl ether, 2,6-di-t-butyl-4-methylphenol, 2,2-methylenebis(6-t-4-methylphenol), 4,4-butylenebis(6-t-butyl-3-methylphenol), ethylenebis(oxyethylene)bis[3-(5-t-butyl-4-hydroxy-m-tolyl)propionate], octadecyl-3-(3,5-di-t-butyl-4-hydroxyphenyl)propionate, pentaerythritol tetrakis[3-(3,5-di-t-butyl-4-hydroxyphenyl)propionate], and hydroxy amine.

The addition amount of the polymerization inhibitor, when added, is preferably 0.01 to 0.5 parts by mass and more preferably 0.01 to 0.1 parts by mass, with respect to 100 parts by mass of the monomers initially added. It is possible to terminate the polymerization reaction effectively when the addition amount is 0.01 parts or more by mass. It is also possible to improve the adhesive properties of the adhesive obtained when it is 0.5 parts or less by mass.

(4) Antioxidant

In the present invention, an antioxidant is added to improve the discoloration resistance under heat or light of the chloroprene rubber composition and the adhesive composition obtained. The antioxidant used in the present invention is characteristically a phosphorus- or phenol-based compound and, in particular, combined use of these compounds is preferable. These antioxidants are added with the polymerization inhibitor when the polymerization reaction is terminated.

When the phenol- and phosphorus-based compounds are used in combination, the content ratio may be determined arbitrarily according to the desired physical properties of the chloroprene rubber composition. In particular, it is preferable to adjust the content of the phenol-and phosphorus-based compounds so that phenol-based compound:phosphorus-based compound ratio becomes 0.5 to 5:1. It is possible, when the ratio is in the range above, to improve the discoloration resistance under heat or light of the chloroprene rubber composition and the adhesive composition obtained.

Examples of the phosphorus-based compounds include 2,2'-methylenebis(4,6-di-butylphenyl)octyl phosphite, 3,9-bis(2,6-di-tert-butyl-4-methylphenoxy)-2,4,8,10-tetraoxa-3,9-diphosphaspiro[5.5]undecane, tris(2,4-di-tertbutylphenyl) phosphite, bis(2,4-di-t-butylphenyl)pentaerythritol diphosphite, and 6-[3-(3-t-butyl-hydroxy-5-methylphenyl)propoxy]-2,4,8,10-tetra-t-butylbenzo[d, f][1,3,2]-dioxaphosphepin.

The addition amount of the phosphorus-based compound, when used, is preferably adjusted to 0.005 to 0.5 parts by mass and more preferably 0.03 to 0.3 parts by mass, with respect to 100 parts by mass of the monomers at least containing chloroprene. It is possible to improve the discoloration resistance under heat or light when the addition amount is 0.005 parts or more by mass. It is also possible to improve the adhesive properties of the adhesive obtained when it is 0.5 parts or less by mass.

Examples of the phenol-based compounds include 2,2'-methylenebis(4-ethyl-6 tert-butylphenol), 2,2'-methylenebis(4-methyl-6 tert-butylphenol), pentaerythritol tetrakis[3-(3,5-di-t-butyl-4-hydroxyphenyl)propionate)] octadecyl 3-(3,5-di-t-butyl-4-hydroxyphenyl)propionate), ethylenebis(oxyethylene)bis[3-(3,54-butyl-4-hydroxy-m-tolylpropionate)], and 2-methyl-4,6-bis octyl thiomethylphenol. It is possible by using at least one of the polymerization inhibitors listed above to make the color tone of the chloroprene rubber composition paler.

The addition amount of the phenol-based compound, when used, is preferably 0.01 to 1.0 parts by mass and more preferably 0.05 to 0.5 parts by mass, with respect to 100 parts by mass of the monomers at least containing chloroprene. It is possible to improve the discoloration resistance under heat or light when the addition amount is 0.01 parts or more by mass. It is also possible, when it is 1.0 part or less by mass, to improve the adhesive properties of the adhesive obtained.

The final polymerization rate of the chloroprene rubber composition according to the present invention can be modified properly according to its application (for example, according to desired physical properties and application when used for an adhesive). In particular in the present invention, the final polymerization rate is preferably set to 50% or more, more preferably 60 to 95% and still more preferably 62 to 82%. It is possible to improve coating processability, while preserving the adhesive strength of the adhesive obtained, by regulating the polymerization rate in the range above.

The method for terminating the polymerization reaction in the present invention may be a method other than addition of a polymerization inhibitor, if the advantageous effects of the present invention are not impaired. It is possible to use arbitrarily a method conventionally used for terminating polymerization, such as alteration of reaction temperature.

(5) Dispersant

In the present invention, a dispersant may be used in combination with an emulsifier for stabilized regulation of the polymerization reaction of the monomers at least containing chloroprene. The dispersant that can be used in the present invention may be one or more dispersants arbitrarily selected from those that can be used in chloroprene rubber compositions.

In the present invention, a surfactant having two kinds of hydrophilic anion groups is favorably used as the dispersant. The inventors have found that, when a rosin acid salt is used as emulsifier in emulsion polymerization of a chloroprene rubber composition, in particular when a surfactant having two kinds of hydrophilic anion groups is used in combination of a dispersant, the effectiveness of polymerization stabilization is improved drastically and the color development of the polymer composition is suppressed significantly. The surfactant having two kinds of hydrophilic anion groups, which forms a strong electric double layer, give a highly stable micelle. As a result, the emulsion for preparation of the chloroprene rubber composition according to the present invention is more stabilized during emulsion polymerization. The chloroprene rubber composition obtained from the stabilized micelle is resistant to dehydrochlorination reaction and, consequently, give a composition resistant to yellowing.

The surfactant having two kinds of hydrophilic anion groups that can be used in the present invention may be one or more surfactants having two kinds of hydrophilic anion groups arbitrarily selected from those that can be used in chloroprene rubber compositions. Examples thereof include sulfated fatty acid salts such as sodium sulfooleate; alkyl sulfosuccinic acid salts such as sodium lauryl sulfosuccinate, sodium dioctyl sulfosuccinate, and sodium di-2-ethylhexyl sulfosuccinate; polyoxyethylene alkyl sulfosuccinic acid salts such as disodium polyoxyethylene lauryl sulfosuccinate; monoalkyl succinate sulfonate salts such as disodium monoalkyl succinate sulfonate. In particular in the present invention, it is preferable to use an alkyl sulfosuccinic acid salt or a sulfated fatty acid salt.

In the present invention, the dispersant is preferably used in an amount of 0.05 to 4.0 parts by mass with respect to total 100 parts by mass of the monomers at least containing chloroprene. It is possible to stabilize regulation of the polymerization reaction reliably when it is used in an amount of 0.05 parts or more by mass and to reduce discoloration of the chloroprene rubber obtained when it is used in an amount of 4.0 parts or less by mass. The addition amount of the dispersant in the present invention may be set to an arbitrary value in the range above, but it is more preferably set to a value in the range of 0.1 to 1.5 parts by mass with respect to total 100 parts by mass of the monomers at least containing chloroprene.

(6) Polymerization Initiator

In the present invention, a polymerization initiator is added to initiate polymerization of the monomers at least containing chloroprene. The polymerization initiator that can be used in the present invention may be one or more polymerization initiators arbitrarily selected from those that can be used in chloroprene rubber compositions. Examples thereof include inorganic peroxides such as potassium persulfate and organic peroxides such as ketone peroxides, peroxyketals, hydroperoxides, dialkyl peroxides, and diacyl peroxides. In particular in the present invention, potassium persulfate is preferably used from the viewpoint of stabilized polymerization.

The addition amount of the polymerization initiator in the present invention is preferably adjusted to 0.01 to 1.0 parts by mass and more preferably 0.02 to 0.4 parts by mass, with respect to 100 parts by mass of the monomers at least containing chloroprene. It is possible to improve the efficiency of the polymerization reaction when the addition amount of the polymerization initiator is in the range above.

The polymerization initiator used in the present invention is preferably used as an aqueous solution at a concentration of 0.1 to 5 mass %.

(7) Promoter

In the present invention, a promoter is used for improvement of the activity of the polymerization initiator. The promoter that can be used in the present invention may be one or more promoters arbitrarily selected from those that can be used in chloroprene rubber compositions. Examples thereof include sodium sulfite, potassium sulfite, sodium bisulfite, formamidinesulfinic acid, potassium pyrosulfite, and sodium hydrosulfite. It is possible by using at least one of the promoters exemplified above to make the color tone of the chloroprene rubber composition paler.

The amount of the promoter used in the present invention is preferably adjusted to 0.3 to 60 parts by mass and more preferably 0.5 to 10 parts by mass, with respect to 100 parts by mass of the monomers at least containing chloroprene.

(8) Chain-transfer Agent

In the present invention, a chain-transfer agent is added to adjust the polymerization rate of the monomers at least containing chloroprene. The chain-transfer agent that can be used in the present invention is not particularly limited, if the advantageous effects of the present invention are not impaired, and may be one or more chain-transfer agents arbitrarily selected from those that can be used in chloroprene rubber compositions. Examples thereof include long-chain-alkyl mercaptans such as n-dodecylmercaptan, tert-dodecylmercaptan, and n-octyl mercaptan; dialkylxanthogen disulfides such as diisopropylxanthogen disulfide and diethylxanthogen disulfide; thiuram compounds such as tetraethylthiuram sulfide, tetrabutylthiuram sulfide, and tetramethylthiuram disulfide; and iodoform.

The amount of the chain-transfer agent added in the present invention is preferably adjusted to 0.05 to 1.0 parts by mass and more preferably 0.08 to 0.8 parts by mass, with respect to 100 parts by mass of the monomers at least containing chloroprene. It is possible, when the addition amount of the chain-transfer agent is in the range above, to regulate the polymerization reaction easily.

(9) Ultraviolet Absorbent

In the present invention, an ultraviolet absorbent is added to further improve the discoloration resistance under heat or light of the chloroprene rubber composition obtained. The ultraviolet absorbent that can be used in the present invention may be one or more ultraviolet absorbents arbitrarily selected from those that can be used in chloroprene rubber compositions. It is, for example, a benzotriazole ultraviolet absorbent.

The benzotriazole ultraviolet absorbent, when used, is not limited in its kind and can be one or more benzotriazole ultraviolet absorbents arbitrarily selected from those that can be used in chloroprene rubber compositions. Examples thereof include 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-t-butylphenol, 2-[5-chloro-2H)-benzotriazol-2-yl]-4 methyl-6-(t-butyl)phenol, 2,4-di-t-butyl-6-(5-chlorobenzotriazol-2-yl)phenol, 2-(2H-benzotriazol-2-yl)-4,6-di-t-pentylphenol, 2-(2H-benzotriazol-2-yl)-4-(1,1,3,3-tetramethylbutyl)phenol, methyl-3-(3-(2H-benzotriazol-2-yl)-5-t-butyl-4-hydroxyphenyl)propionate/polyethylene glycol 300, and 2-(2H-benzotriazol-2-yl)-4-methylphenol.

The amount of the benzotriazole ultraviolet absorbent added in the present invention is preferably adjusted to 0.01 to 1.0 parts by mass with respect to 100 parts by mass of the monomers at least containing chloroprene. It is possible to improve the discoloration resistance under heat or light further when the addition amount of the benzotriazole ultraviolet absorbent is 0.01 parts or more by mass and to prevent deterioration of the adhesive strength of the chloroprene rubber-containing adhesive when it is 1.0 part or less by mass.

(10) Photostabilizer

In the present invention, a photostabilizer is added for further improvement of the discoloration resistance under heat or light of the chloroprene rubber composition obtained. The photostabilizer that can be used in the present invention may be one or more photostabilizers arbitrarily selected from those that can be used in chloroprene rubber compositions. Examples thereof include hindered amine-based photostabilizers and the like.

The hindered amine-based photostabilizer, when used, is not limited in its kind and may be one or more hindered amine-based photostabilizers arbitrarily selected from those that can be used in chloroprene rubber compositions. Examples thereof include N,N',N",N"-tetrakis-[4,6-bis-(butyl-(N-methyl-2,2,6,6-tetramethyl piperidin-4-yl)amino)-triazin-2-yl]-4,7-diazadecane-1,10-diamine, polycondensates of dibutylamine-1,3,5-triazine-N,N'-bis(2,2,6,6,-tetramethyl-4-piperidyl)-1,6-hexamethylenediamine-N-(2,2,6,6,-tetramethyl-4-piperidyl)butylamine, poly[{6-(1,1,3,3-tetramethyl butyl)amino-1,3,5-triazine 2,4-diyl}{(2,2,6,6,-tetramethyl-4 piperidyl)imino}hexamethylene{(2,2,6,6,-tetramethyl-4-piperidyl)imino}], polymers of dimethyl succinate and 4-hydroxy-2,2,6,6,-tetramethyl-1-piperidine ethanol, bis(1,2,2,6,6,-pentamethyl-4-piperidyl)[{3,5-bis(1,1-dimethylethyl)-4-hydroxyphenyl}methyl]butyl malonate, bis(1,2,2,6,6,-pentamethyl-4-piperidyl)sebacate, bis-1,2,2,6,6-pentamethyl-4-piperidyl sebacate, and bis(2,2,6,6,-tetramethyl-4-piperidyl) sebacate.

The amount of the hindered amine photostabilizer added in the present invention is preferably adjusted to 0.01 to 1.0 parts by mass with respect to 100 parts by mass of the monomers at least containing chloroprene. It is possible to improve the discoloration resistance under heat or light further when the addition amount of the hindered amine photostabilizer is 0.01 parts or more by mass and to prevent deterioration of the adhesive strength of the chloroprene rubber-containing adhesive when it is 1.0 part or less by mass.

(11) Neutralizer

In the present invention, a neutralizer is added for adjustment of the pH of the obtained chloroprene rubber composition to neutrality. The neutralizer that can be used in the present invention may be one or more neutralizers arbitrarily selected from those that can be used in chloroprene rubber compositions. Examples thereof include aqueous solutions of an acidic substance such as acetic acid or hydrochloric acid and those of a basic substance such as sodium hydroxide, potassium hydroxide, or sodium carbonate.

Proper selection and regulation of the polymerization initiator, chain-transfer agent, terminator, final polymerization rate, and others, as described above, permits control of the molecular weight, molecular weight distribution, molecular-terminal structure, crystallization speed, and the like of the chloroprene rubber composition according to the present invention.

<2. Adhesive Composition>

The chloroprene rubber composition according to the present invention, which has excellent discoloration resistance under heat or light, can be used favorably as an adhesive composition. Specifically, the adhesive composition according to the present invention contains at least the chloroprene rubber composition according to the present invention and an organic solvent (1). It may contain, as needed, a metal oxide (2), an adhesive resin (3), and the like additionally. Hereinafter, each component will be described in detail. The blending composition of the chloroprene rubber composition according to the present invention will not be described below, as it is similar to that described above.

(1) Organic Solvent

In the present invention, an organic solvent is used to make the chloroprene rubber composition fluidal by dissolving the soluble matter therein and dispersing the insoluble matter. The organic solvent that can be used in the present invention may be one or more organic solvent arbitrarily selected from those that can be used in adhesives. Examples thereof include toluene, xylene, acetone, methyl ethyl ketone, n-hexane, cyclohexane, methylcyclohexane, cyclopentane, isopropyl acetate, and ethyl acetate.

The chloroprene rubber composition can be used as an adhesive, as it is dissolved or dispersed in such an organic solvent or a mixed solvent. It may also be used as a graft adhesive, after it is graft-polymerized with an acrylic monomer such as methyl methacrylate.

The amount of the organic solvent used in the present invention is preferably adjusted so that the solid matter concentration of the chloroprene rubber composition becomes in the range of 10 to 40 mass %. Adjustment of the amount of the organic solvent in the range leads to improved balance in the adhesive strength under heat, initial adhesive strength, and coatability as adhesive.

(2) Metal Oxide

The adhesive composition according to the present invention may contain a metal oxide additionally. The metal oxide that can be used in the present invention may be one or more metal oxides arbitrarily selected from those that can be used in adhesives. Examples thereof include zinc oxide (zinc white), aluminum oxide, titanium oxide, and magnesium oxide.

(3) Adhesive Resin

The adhesive composition according to the present invention may contain an adhesive resin additionally. The adhesive resin that can be used in the present invention may be one or more adhesive resins that can be used in adhesives. Examples thereof include phenol resins, rosin resins, coumarone resins, and petroleum resins.

The adhesive composition according to the present invention can be prepared by a general adhesive production method of dissolving an alkylphenol resin and magnesium oxide (MgO) in an organic solvent, leaving still the mixture at around 25° C. for about 20 hours, and dissolving additionally therein a mixture of a chloroprene rubber composition, a metal oxide, an aging inhibitor, and others which is prepared by kneading with a roll. In addition, the chloroprene rubber composition according to the present invention may be used as an adhesive, as it is dissolved or dispersed directly in an organic solvent, without roll-kneading with the metal oxide, aging inhibitor, and others.

The adhesive composition according to the present invention described above, which is superior in discoloration resistance under heat or light, can be used as an adhesive for various materials because of its properties. Such materials include, for example, papers, woods, cloths, natural leathers, shoe materials, jerseys, synthetic leathers, rubbers, plastics, foams, ceramics, glasses, mortars, cement-based materials, synthetic ceramics, and metals. The adhesive can be used favorably for bonding or adhesion of materials in the same kind or in different kinds.

<3. Production Method for Chloroprene Rubber Composition>

The chloroprene rubber composition according to the present invention is prepared by carrying out emulsion polymerization of a total 100 parts by mass of monomers at least containing chloroprene (1) in the presence of a particular amount of a rosin acid salt (2) as emulsifier and terminating the emulsion polymerization by addition of a polymerization inhibitor (3) and a phosphorus- or phenol-based compound (4) as antioxidant. A dispersant (5) may be used additionally in the emulsion polymerization. In addition, a polymerization initiator (6) may be used to initiate the polymerization. It is possible to improve the activity of the polymerization initiator using a promoter (7). In the production method according to the present invention, it is also possible to regulate the polymerization rate during the emulsion polymerization using a chain-transfer agent (8).

The polymerization temperature during the emulsion polymerization in production of the chloroprene rubber composition according to the present invention may be altered arbitrarily according to the desired molecular weight, molecular weight distribution, molecular-terminal structure, crystallization speed, and others of the chloroprene rubber composition obtained by polymerization. In particular in the present invention, the polymerization temperature during emulsion polymerization is preferably adjusted to 8 to 45° C.

The polymerization reaction is terminated when the polymerization reaction reaches a desired polymerization rate. It is preferable to terminate the polymerization when the monomer conversion rate reached 50 to 90%.

The present invention is characterized in that a particular phosphorus- or phenol-based compound as antioxidant is added with a polymerization inhibitor for termination of the polymerization. However, it is possible to use a method other than addition of a polymerization inhibitor, if the advantageous effects of the present invention are not impaired. It is possible to terminate the polymerization by a general method, for example, of terminating it by change of reaction temperature.

The chloroprene rubber composition prepared by the production method for the chloroprene rubber composition according to the present invention may contain an ultraviolet absorbent (8), a photostabilizer (9), and the like additionally. In this case, the ultraviolet absorbent and the photostabilizer can also be added by a general method, as it is arbitrarily selected. In particular in the present invention, it is preferable for improvement of the dispersion state in the chloroprene rubber composition to use a method of dissolving the additives in chloroprene monomer, adding the mixture to the chloroprene polymer, and removing the chloroprene monomer under reduced pressure after addition or a method of emulsifying these additives with a surfactant and adding the emulsion to the chloroprene polymer latex.

In production of the chloroprene rubber composition according to the present invention, unreacted monomers and others may be removed after the polymerization reaction. The unreacted monomer and others can be removed by a general method, as it is arbitrarily selected. For example, the unreacted monomer and others can be removed by exposing the reaction solution to high temperature by steam flashing method or concentration method.

In production of the chloroprene rubber composition according to the present invention, it is possible to obtain a chloroprene rubber composition in the solid state by adding a neutralizer (10) to the chloroprene rubber composition after removal of the unreacted monomers and others therein for adjustment of the pH to neutrality and then, performing final drying treatment by a method for example by freeze coagulation method or salting out method.

In the production method according to the present invention described above, proper selection and regulation of the polymerization temperature during polymerization reaction, polymerization initiator, chain-transfer agent, terminator, final polymerization rate, and others permits regulation of the molecular weight, molecular weight distribution, the molecular-terminal structure, crystallization speed, and others of the polychloroprene obtained by the polymerization.

Details of the specific kinds and the addition amounts of the monomers at least containing chloroprene (1), the emulsifier (2), the polymerization inhibitor (3), the antioxidant (4), the dispersant (5), the polymerization initiator (6), the promoter (7), the chain-transfer agent (8), the ultraviolet absorbent (9), the photostabilizer (10), the neutralizer (11), and others and the final polymerization rate of the chloroprene rubber composition are the same as those described for the chloroprene rubber composition above and thus description thereof is omitted.

EXAMPLES

Hereinafter, the present invention will be described more in detail with reference to Examples and the advantageous effects of the present invention verified. It should be understood that the Examples described below are only typical examples of the present invention and the scope of the present invention is not restricted thereby at all.

1. Example 1

In Example 1, the antioxidant favorable for use in the chloroprene rubber composition according to the present invention and the adhesive using the same was evaluated.

[Preparation of Chloroprene Rubber Composition]

The chloroprene rubber compositions of Examples 1 to 11 and Comparative Example 1 were prepared by the method described below.

Example 1

0.3 parts by mass of sodium salt of a β-naphthalenesulfonic acid formalin condensate (trade name: "FD-40" (registered trademark), produced by Dai-ichi Kogyo Seiyaku Co., Ltd.) and 0.01 parts by mass of sodium sulfite were added to and dissolved in an aqueous emulsifier solution prepared by mixing 120 parts by mass of water, 4.0 parts by mass of a rosin acid sodium salt (trade name: "Rondis 3R", produced by Arakawa Chemical Industries, Ltd.), and 0.5 parts by mass of potassium hydroxide. The solution was stirred in a reactor having a capacity of 5 liters and 100 parts by mass of chloroprene and 0.1 parts by mass of n-dodecylmercaptan were added thereto. The solution was then subjected to emulsion polymerization under nitrogen gas atmosphere at 10° C., using 0.05 parts by mass of potassium persulfate as polymerization initiator. When the final polymerization rate reached 70%, an emulsion containing 0.5 parts by mass of 2-methyl-4,6-bis-octylthiomethylphenol (trade name: "Antage HP-400", produced by Kawaguchi Chemical Industry Co., Ltd.), 0.2 parts by mass of tris(2,4-di-tertbutylphenyl)phosphite (trade name: "ADK Stab 2112" (registered trademark), produced by ADEKA Corp.), 0.2 parts by mass of 6-[3-(3-t-butyl-hydroxy-5-methylphenyl)propoxy]-2,4,8,10-tetra-t-butylbenzo[d,f][1,3,2]-dioxaphosphepin (trade name: "Sumilizer GP" (registered trademark), produced by Sumitomo Chemical Co. Ltd.), and 0.08 parts by mass of diethylhydroxylamine was added thereto for termination of the polymerization. Unreacted monomers in the reaction solution were removed under reduced pressure, to give a polychloroprene rubber latex. The latex obtained was adjusted to a pH of 7, using 10% aqueous acetic acid solution. The latex was then dried by freeze-coagulation drying method, to give a rubber sheet of the chloroprene rubber composition.

Examples 2 to 11 and Comparative Example 1

Rubber sheets of various chloroprene rubber compositions were prepared under a condition similar to that in Example 1, except that the polymerization was carried out using the compositions and conditions respectively shown in Table 1 below.

[Evaluation of Chloroprene Rubber Compositions]

The color b value and the discoloration resistance of the chloroprene rubber compositions prepared in Examples 1 to 11 and Comparative Example 1 were evaluated by the following methods:

(1) Color b Value

A sheet of each of the chloroprene rubber compositions prepared in Examples 1 to 11 and Comparative Example 1 was subjected to a color tone test, using Z-Σ80 colorimeter produced by Nippon Denshoku Public Industries Co., Ltd. The color b value indicates yellowish color tone when it is positive and bluish tone when it is negative. A sheet having a color b value of 3.7 or less was considered satisfactory.

(2) Discoloration Resistance

A sheet of each of the chloroprene rubber compositions prepared in Examples 1 to 11 and Comparative Example 1 was irradiated in a xenon weather meter at a black panel temperature of 63° C. for 15 hours and the degree of discoloration in appearance was determined. Light fastness of the sample was evaluated according to the evaluation criteria below:

○: pale yellow

Δ: deep yellow

×: brown

[Preparation of Adhesive Composition]

100 parts by mass of the chloroprene rubber composition prepared in one of Examples 1 to 11 and Comparative Example 1, 400 parts by mass of toluene, 200 parts by mass of methyl ethyl ketone, 60 parts by mass of methyl methacrylate, and 0.5 parts by mass of benzoyl peroxide were placed in a reactor having a capacity of 10 L and the mixture was subjected to graft polymerization at 80° C. After 5 hours, 2,2'-methylenebis(4-ethyl-6-tert-butylphenol) (trade name: "Nocrack NS-5" (registered trademark), produced by Ouchi Shinko Chemical Industrial Co., Ltd.) was added thereto and the solution was cooled to 15° C. to terminate the polymerization. The polymerization rate was 45%.

[Evaluation of Adhesive Composition]

The color tone, tackiness, initial adhesive strength, and normal-state adhesive strength of the adhesive compositions containing respectively the chloroprene rubber compositions prepared in Examples 1 to 11 and Comparative Example 1 were examined by the following methods:

(1) Color Tone

The adhesive solution prepared by using one of the chloroprene rubber compositions prepared in Examples 1 to 11 and Comparative Example 1 was placed in a glass bottle and the color tone thereof was evaluated by visual observation according to the following evaluation criteria:

⊚: almost transparent

○: pale yellow

Δ: deep yellow

×: dark brown (2) Tackiness

The adhesive solution prepared by using one of the chloroprene rubber compositions prepared in Examples 1 to 11 and Comparative Example 1 was coated on a cellophane sheet with a brush under the condition of 23° C. and 50% RH, and the tackiness thereof after it is left for 5 minutes was evaluated according to the following evaluation criteria:

○: favorably adhesive

Δ: slightly adhesive

×: defective (3) Initial and Normal-State Adhesive Strengths

The adhesive composition prepared using one of the chloroprene rubber compositions prepared in Examples 1 to 11 and Comparative Example 1 was coated on two canvas sheets (25×150 mm) in a coating amount of 200 g/m². The open time was set to 30 minutes and the adhesive composition was pressed five times reciprocally with a hand roller. The 180° peeling strengths were determined at a stress rate of 200 mm/min 3 hours and 10 days after the set time and used as the initial and normal-state adhesive strengths.

[Results]

Results of Examples 1 to 11 and Comparative Example 1 are summarized in Table 1.

TABLE

| | | | Example | | | | | |
| --- | --- | --- | --- | --- | --- | --- | --- | --- |
| | | | 1 | 2 | 3 | 4 | 5 | 6 |
| Polymerization composition (part) | Monomer | Chloroprene | 100 | 100 | 100 | 100 | 100 | 100 |
| | | Dichlorobutadiene | 0 | 0 | 0 | 0 | 0 | 0 |
| | Initiator | Potassium persulfate | 0.05 | 0.05 | 0.05 | 0.05 | 0.05 | 0.05 |
| | Promoter | Formamidinesulfinic acid | 0.01 | 0.01 | 0.01 | 0.01 | 0.01 | 0.01 |
| | Chain-transfer agent | n-Dodecylmercaptan | 0.1 | 0.1 | 0.1 | 0.1 | 0.1 | 0.1 |
| | Rosin | Rondis 3R | 4 | 4 | 4 | 0 | 0 | 0 |
| | | Rondis FR *1 | 0 | 0 | 0 | 4 | 4 | 4 |
| | Dispersant | Lavelin FD-40 | 0.3 | 0.3 | 0.3 | 0.3 | 0 | 0 |
| | | Nopco 38C *2 | 0 | 0 | 0 | 0 | 0.3 | 0.3 |
| | Polymerization inhibitor | Diethylhydroxylamine | 0.08 | 0.08 | 0.08 | 0.08 | 0.08 | 0.08 |
| | Antioxidant Phenol-based compound | Antage HP-400 | 0.5 | 0.5 | 0 | 0 | 0 | 0 |
| | | Nocrack NS-5 *3 | 0 | 0 | 0.6 | 0.3 | 0.3 | 0.8 |
| | Phosphorus-based compound | ADK Stab HP-10 *4 | 0 | 0 | 0.2 | 0.2 | 0 | 0 |
| | | ADK Stab PEP36 *5 | 0 | 0 | 0 | 0 | 0 | 0.4 |
| | | ADK Stab PEP24G *6 | 0 | 0 | 0 | 0 | 0 | 0 |
| | | ADK Stab 2112 | 0.2 | 0.2 | 0 | 0 | 0.1 | 0 |
| | | SumilizerGP | 0.2 | 0.2 | 0 | 0 | 0.1 | 0 |
| | Phenol-based compound:phosphorus-based compound | | 1.25:1 | 1.25:1 | 3:1 | 1.5:1 | 1.5:1 | 2:1 |
| Polymerization condition | | Polymerization temperature (° C.) | 10 | 10 | 10 | 10 | 10 | 15 |

TABLE-continued

| Evaluation | Chloroprene rubber composition / Adhesive composition | | | | | | | |
|---|---|---|---|---|---|---|---|---|
| | Polymerization rate (%) | 70 | 70 | 70 | 70 | 70 | 70 |
| | Color b value (−) | 0.9 | 0.8 | 0.7 | 0.2 | 0.1 | 0.2 |
| | Discoloration resistance | ○ | ○ | ○ | ○ | ◎ | ◎ |
| | Color tone | ○ | ○ | ○ | ◎ | ◎ | ◎ |
| | Tackiness | ◎ | ◎ | ◎ | ○ | ○ | ◎ |
| | Initial adhesive strength (3 hours) N/mm | 0.56 | 0.57 | 0.58 | 0.57 | 0.58 | 0.57 |
| | Adhesive strength in the normal state (10 days) N/mm | 1.8 | 1.7 | 1.6 | 1.7 | 1.7 | 1.6 |

| | | | Example | | | | | Comparative Example |
|---|---|---|---|---|---|---|---|---|
| | | | 7 | 8 | 9 | 10 | 11 | 1 |
| Polymerization composition (part) | Monomer | Chloroprene | 100 | 95 | 95 | 100 | 100 | 100 |
| | | Dichlorobutadiene | 0 | 5 | 5 | 0 | 0 | 0 |
| | Initiator | Potassium persulfate | 0.05 | 0.05 | 0.05 | 0.05 | 0.05 | 0.05 |
| | Promoter | Formamidinesulfinic acid | 0.01 | 0.01 | 0.01 | 0.01 | 0.01 | 0.01 |
| | Chain-transfer agent | n-Dodecylmercaptan | 0.1 | 0.1 | 0.1 | 0.1 | 0.1 | 0.1 |
| | Rosin | Rondis 3R | 0 | 0 | 0 | 4 | 4 | 4 |
| | | Rondis FR *1 | 4 | 4 | 4 | 0 | 0 | 0 |
| | Dispersant | Lavelin FD-40 | 0 | 0 | 0 | 0.3 | 0.3 | 0.3 |
| | | Nopco 38C *2 | 0.3 | 0.3 | 0.3 | 0 | 0 | 0 |
| | Polymerization inhibitor | Diethylhydroxylamine | 0.08 | 0.08 | 0.08 | 0.08 | 0.08 | 0.08 |
| | Antioxidant — Phenol-based compound | Antage HP-400 | 0 | 0 | 0 | 0.5 | 0 | 0 |
| | | Nocrack NS-5 *3 | 0.25 | 0.3 | 0.3 | 0 | 0 | 0 |
| | Phosphorus-based compound | ADK Stab HP-10 *4 | 0 | 0 | 0 | 0 | 0.3 | 0 |
| | | ADK Stab PEP36 *5 | 0 | 0 | 0 | 0 | 0 | 0 |
| | | ADK Stab PEP24G *6 | 0.5 | 0 | 0 | 0 | 0 | 0 |
| | | ADK Stab 2112 | 0 | 0.1 | 0 | 0 | 0 | 0 |
| | | SumilizerGP | 0 | 0 | 0.1 | 0 | 0 | 0 |
| | Phenol-based compound:phosphorus-based compound | | 0.5:1 | 3:1 | 3:1 | — | — | — |
| Polymerization condition | | Polymerization temperature (° C.) | 10 | 10 | 10 | 10 | 10 | 10 |
| Evaluation | Chloroprene rubber composition / Adhesive composition | Polymerization rate (%) | 80 | 70 | 70 | 70 | 70 | 70 |
| | | Color b value (−) | 0.3 | 0.2 | 0.2 | 2.1 | 2.5 | 3.1 |
| | | Discoloration resistance | ○ | ◎ | ◎ | Δ | Δ | X |
| | | Color tone | ◎ | ◎ | ◎ | Δ | Δ | X |
| | | Tackiness | ○ | ◎ | ◎ | ◎ | ◎ | ◎ |
| | | Initial adhesive strength (3 hours) N/mm | 0.61 | 0.55 | 0.57 | 0.56 | 0.57 | 0.58 |
| | | Adhesive strength in the normal state (10 days) N/mm | 1.8 | 1.4 | 1.4 | 1.6 | 1.7 | 1.8 |

*1 Rondis FR: a gum rosin having a Gardner color scale of 4 or less (produced by Arakawa Chemical Industries, Ltd.)
*2 Nopco 38C (registered trademark): sulfated sodium oleate (produced by San Nopco Ltd.)
*3 Nocrack NS-5 (registered trademark): 2,2'-methylenebis(4-ethyl-6 tert-butylphenol) (produced by Ouchi Shinko Chemical Industrial Co., Ltd.)
*4 ADK Stab HP-10 (registered trademark): 2,2'-methylene bis(4,6-di-butylphenyl)octyl phosphite (produced by ADEKA Corp.)
*5 ADK Stab PEP36 (registered trademark): 3,9-bis(2,6-di-tert-butyl-4-methylphenoxy)-2,4,8,10-tetraoxa-3,9-diphosphaspiro[5.5]undecane (produced by ADEKA Corp.)
*6 ADK Stab PEP24G (registered trademark): bis(2,4-di-t-butylphenyl)pentaerythritol di phosphite (produced by ADEKA Corp.)

As shown in Table 1, the adhesive compositions of Example 1 to 11, which were prepared using a phenol-based compound and/or a phosphorus-based compound showed paler color tone and discoloration resistance under heat or light better than that of Comparative Example 1, while showing similar tackiness and initial and normal-state strengths.

Among the chloroprene rubber compositions of Examples 1 to 11, those of Examples 1 to 9, which were prepared using phenol- and phosphorus-based compounds in combination, showed discoloration resistance under heat or light better than those of Example 10 or 11, which was prepared using the phenol- or phosphorus-based compound.

2. Example 2

In Example 2, the composition of the chloroprene rubber composition and the adhesive using the same suitable for them to show favorable discoloration resistance under heat or light was studied.

[Preparation of Chloroprene Rubber Composition]

Chloroprene rubber compositions of Examples 12 to 29 and Comparative Examples 2 and 3 were prepared by the methods shown below.

Example 12

0.3 parts by mass of sodium di-2-ethylhexyl sulfosuccinate (trade name: "RAPISOL A-90" (registered trademark), NOF Corp.) and 0.01 parts by mass of sodium sulfite were added to and dissolved in an aqueous emulsifier solution obtained by mixing 120 parts by mass of water, 4.0 parts by mass of a rosin acid sodium salt (trade name: "Rondis 3R", produced by Arakawa Chemical Industries, Ltd.), and 0.5 parts by mass of potassium hydroxide. 100 parts by mass of chloroprene and 0.15 parts by mass of n-dodecylmercaptan were added to the solution placed in a reactor having a capacity of 5 liters, as it is agitated. The solution was then subjected to emulsion polymerization under nitrogen gas atmosphere at 10° C., using 0.05 parts by mass potassium persulfate as polymerization initiator. When the final polymerization rate reached 70%, an emulsion of 0.06 parts by mass of 2-methyl-4,6-bis-octylthiomethylphenol (trade name: "Antage HP-400", produced by Kawaguchi Chemical Industry Co., Ltd.) and 0.08 parts by mass of diethylhydroxylamine was added thereto, to terminate the polymerization. Unreacted monomers in the reaction solution were removed under reduced pressure, to give a polychloroprene rubber latex. The latex obtained was adjusted to a pH of 7 with 10% aqueous acetic acid solution. The latex was then dried by freeze-coagulation drying method, to give a rubber sheet of the chloroprene rubber composition.

Examples 13 to 29

Rubber sheets of chloroprene rubber composition were prepared in a manner similar to Example 12, except that polymerization was carried out under the condition shown in the following Table 2 or 3.

Comparative Examples 2 and 3

Rubber sheets of chloroprene rubber composition were prepared in a manner similar to Example 12, except that polymerization was carried out under the condition shown in the following Table 4.

[Evaluation of Chloroprene Rubber Compositions]

The color b value and the discoloration resistance of the chloroprene rubber compositions prepared in Examples 12 to 29 and Comparative Examples 2 and 3 were determined by methods similar to those described in Example 1.

[Preparation of Graft-Type Adhesives]

Graft-type adhesives were prepared, using the chloroprene rubber compositions prepared in Examples 12 to 29 and Comparative Examples 2 and 3 by a method similar to that in Example 1.

[Evaluation of Adhesives]

The color tone, tackiness, and adhesive peel strength of the adhesives prepared using the chloroprene rubber compositions prepared in Examples 12 to 29 and Comparative Examples 2 and 3 were evaluated by methods similar to those described in Example 1.

[Results]

Results obtained in Examples 12 to 29 are summarized in Tables 2 and 3 and those obtained in Comparative Examples 2 and 3 in Table 4.

TABLE 2

| | | | Example | | | | | | | | |
|---|---|---|---|---|---|---|---|---|---|---|---|
| | | | 12 | 13 | 14 | 15 | 16 | 17 | 18 | 19 | 20 |
| Polymerization composition (part) | Monomer | Chloroprene | 100 | 100 | 100 | 100 | 100 | 100 | 100 | 100 | 100 |
| | | Dichlorobutadiene | | | | | | | | | |
| | Initiator | Potassium persulfate | 0.05 | 0.05 | 0.05 | 0.05 | 0.05 | 0.05 | 0.05 | 0.05 | 0.05 |
| | Promoter | Sodium sulfite | 0.01 | 0.01 | 0.01 | 0.01 | — | — | — | — | — |
| | | Formamidinesulfinic acid | — | — | — | — | 0.01 | 0.01 | 0.01 | 0.01 | 0.01 |
| | | Sodium anthraquinone-β-sulfonate | — | — | — | — | — | — | — | — | — |
| | | Iron(II) oxide | — | — | — | — | — | — | — | — | — |
| | Chain-transfer agent | n-Dodecylmercaptan | 0.1 | 0.1 | 0.1 | 0.1 | 0.1 | 0.1 | 0.1 | 0.1 | 0.1 |
| | Rosin | Rondis 3R | 4 | — | — | — | 4 | 4 | 4 | 4 | 4 |
| | | Diprodine K-25 *1 | — | 4 | — | — | — | — | — | — | — |
| | | Rondis FR | — | — | 4 | — | — | — | — | — | — |
| | | Pinecrystal KR-85 *2 | — | — | — | 4 | — | — | — | — | — |
| | Solvent | Purified water | 120 | 120 | 120 | 120 | 120 | 120 | 120 | 120 | 120 |
| | Dispersant | Rapisol A-90 | 0.3 | 0.3 | 0.3 | 0.3 | 0.3 | 0 | 0 | 0 | 0 |
| | | Nopco 38C | 0 | 0 | 0 | 0 | 0 | 0.3 | 0.3 | 0.3 | 0.3 |
| | | Lavelin FD-40 | 0 | 0 | 0 | 0 | 0 | 0 | 0 | 0 | 0 |
| | Polymerization inhibitor | Diethylhydroxylamine | 0.08 | 0.08 | 0.08 | 0.08 | 0.08 | 0.08 | 0.08 | 0.08 | 0.08 |
| | Phenol-based antioxidant | Antage HP-400 | 0.06 | 0.06 | 0.06 | 0.06 | 0.06 | 0.06 | 0 | 0 | 0 |
| | | Nocrack NS-5 | 0 | 0 | 0 | 0 | 0 | 0 | 0.06 | 0.06 | 0.06 |
| | Ultraviolet absorbent | Tinuvin 326 *3 | 0 | 0 | 0 | 0 | 0 | 0 | 0 | 0.2 | 0 |
| | | Tinuvin 328 *4 | 0 | 0 | 0 | 0 | 0 | 0 | 0 | 0 | 0.2 |
| | Photostabilizer | Tinuvin 770 *5 | 0 | 0 | 0 | 0 | 0 | 0 | 0 | 0.2 | 0 |
| | | Tinuvin 144 *6 | 0 | 0 | 0 | 0 | 0 | 0 | 0 | 0 | 0.2 |
| Polymerization condition | | Polymerization temperature (° C.) | 10 | 10 | 10 | 10 | 10 | 10 | 10 | 10 | 10 |
| | | Polymerization rate (%) | 70 | 70 | 70 | 70 | 70 | 70 | 70 | 70 | 70 |
| Evaluation | Chloroprene rubber composition | Color b value (−) | 0.9 | 0.8 | 0.4 | 0.2 | 0.8 | 0.7 | 0.7 | 1.0 | 1.0 |
| | | Discoloration resistance | ◯ | ◯ | ◯ | ◯ | ◯ | ◯ | ◯ | ◉ | ◉ |
| | Adhesive composition | Color tone | ◯ | ◯ | ◉ | ◉ | ◯ | ◯ | ◯ | ◯ | ◯ |
| | | Tackiness | ◯ | ◯ | ◯ | ◯ | ◯ | ◯ | ◯ | ◯ | ◯ |
| | | Initial adhesive strength (3 hours) N/mm | 0.55 | 0.57 | 0.58 | 0.57 | 0.56 | 0.57 | 0.56 | 0.51 | 0.51 |
| | | Adhesive strength in the normal state (10 days) N/mm | 1.8 | 1.5 | 1.6 | 1.7 | 1.5 | 1.6 | 1.6 | 1.3 | 1.3 |

H*1 Diprodine K-25 (registered trademark): aqueous solution of gum rosin potassium salt (produced by Toho Chemical Industry Co., Ltd.)
*2 Pinecrystal KR85 (registered trademark): pale colored rosin having a Hazen scale of 150 or less (produced by Arakawa Chemical Industries, Ltd.)
* Tinuvin 326 (registered trademark): 2-[5-chloro(2H)-benzotriazol-2-yl]-4-methyl-6-(t- butyl)phenol (produced by Ciba Specialty Chemicals)
*4 Tinuvin 328 (registered trademark): 2-(2H-benzotriazol-2-yl)-4,6-di-t-pentylphenol (produced by Ciba Specialty Chemicals)
*5 Tinuvin 770 (registered trademark): bis(2,2,6,6,-tetramethyl-4-piperidyl) sebacate (produced by Ciba Specialty Chemicals)*6 Tinuvin 144 (registered trademark): bis(1,2,2,6,6,-pentamethyl-4-piperidyl) [{3,5-bis(1,1- dimethylethyl)-4-hydroxyphenyl}methyl]butyl malonate (produced by Ciba Specialty Chemicals)

TABLE 3

| | | | Example | | | | | | | | |
|---|---|---|---|---|---|---|---|---|---|---|---|
| | | | 21 | 22 | 23 | 24 | 25 | 26 | 27 | 28 | 29 |
| Polymerization composition (part) | Monomer | Chloroprene | 100 | 100 | 90 | 100 | 100 | 100 | 100 | 100 | 100 |
| | | Dichlorobutadiene | — | — | 10 | — | — | — | — | — | — |
| | Initiator | Potassium persulfate | 0.05 | 0.05 | 0.05 | 0.05 | 0.05 | 0.05 | 0.05 | 0.05 | 0.05 |
| | Promoter | Sodium sulfite | — | — | 0.01 | 0.01 | 0.01 | 0.01 | 0.01 | 0.01 | — |
| | | Formamidinesulfinic acid | — | — | — | — | — | — | — | — | — |
| | | Sodium anthraquinone-β-sulfonate | 0.01 | — | — | — | — | — | — | — | — |
| | | Iron(II) oxide | — | 0.01 | — | — | — | — | — | — | 0.01 |
| | Chain-transfer agent | n-Dodecylmercaptan | 0.1 | 0.1 | 0.1 | 0.1 | 0.1 | 0.1 | 0.1 | 0.1 | 0.1 |
| | Rosin | Rondis 3R | 4.0 | 4.0 | 4.0 | 7.0 | 0.5 | 1.1 | 1.1 | 4.0 | 4 |
| | | Diprodine K-25 | — | — | — | — | — | — | — | — | — |
| | | Rondis FR | — | — | — | — | — | — | — | — | — |
| | | Pinecrystal KR-85 | — | — | — | — | — | — | — | — | — |
| | Solvent | Purified water | 120 | 120 | 120 | 120 | 120 | 120 | 120 | 120 | 120 |
| | Dispersant | Rapisol A-90 | 0.0 | 0.0 | 0.3 | 0.3 | 0.3 | 0.05 | 4.0 | 0.3 | 0 |
| | | Nopco 38C | 0.3 | 0.3 | 0 | 0 | 0 | 0 | 0 | 0 | 0 |
| | | Lavelin FD-40 | 0 | 0 | 0 | 0 | 0 | 0 | 0 | 0.1 | 0.3 |
| | Polymerization inhibitor | Diethylhydroxylamine | 0.08 | 0.08 | 0.08 | 0.08 | 0.08 | 0.08 | 0.08 | 0.08 | 0.08 |
| | Phenol-based antioxidant | Antage HP-400 | 0 | 0 | 0.06 | 0.06 | 0.06 | 0.06 | 0.06 | 0.06 | 0 |
| | | Nocrack NS-5 | 0.06 | 0.06 | 0 | 0 | 0 | 0 | 0 | 0 | 0.06 |
| | Ultraviolet absorbent | Tinuvin 326 | 0 | 0 | 0 | 0 | 0 | 0 | 0 | 0 | 0 |
| | | Tinuvin 328 | 0 | 0 | 0 | 0 | 0 | 0 | 0 | 0 | 0 |
| | Photostabilizer | Tinuvin 770 | 0 | 0 | 0 | 0 | 0 | 0 | 0 | 0 | 0 |
| | | Tinuvin 144 | 0 | 0 | 0 | 0 | 0 | 0 | 0 | 0 | 0 |
| | Polymerization condition | Polymerization temperature (° C.) | 10 | 10 | 10 | 10 | 10 | 10 | 10 | 10 | 10 |
| | | Polymerization rate (%) | 70 | 70 | 70 | 70 | 70 | 70 | 70 | 70 | 70 |
| Evaluation | Chloroprene rubber composition | Color b value (−) | 2.5 | 3.6 | 1.1 | 3.2 | 3.3 | 1.1 | 3.5 | 3.3 | 4.7 |
| | | Discoloration resistance | Δ | Δ | ○ | Δ | Δ | ○ | Δ | Δ | Δ |
| | Adhesive composition | Color tone | ○ | Δ | ○ | Δ | Δ | ○ | Δ | Δ | Δ |
| | | Tackiness | ○ | ○ | ○ | ○ | ○ | ○ | ○ | ○ | ○ |
| | | Initial adhesive strength (3 hours) N/mm | 0.53 | 0.54 | 0.56 | 0.48 | 0.51 | 0.52 | 0.47 | 0.52 | 0.55 |
| | | Adhesive strength in the normal state (10 days) N/mm | 1.6 | 1.6 | 1.1 | 1.2 | 1.5 | 1.6 | 1.1 | 1.6 | 1.7 |

TABLE 4

| | | | Comparative Example | |
|---|---|---|---|---|
| | | | 2 | 3 |
| Polymerization composition (part) | Monomer | Chloroprene | 100 | 100 |
| | Initiator | Potassium persulfate | 0.05 | 0.05 |
| | Promoter | Sodium sulfite | 0.01 | 0.01 |
| | | Formamidinesulfinic acid | 0 | 0 |
| | | Sodium anthraquinone-β-sulfonate | — | — |
| | | Iron(II) oxide | — | — |
| | Chain-transfer agent | n-Dodecylmercaptan | 0.1 | 0.1 |
| | Rosin | Rondis 3R | 8 | 0.3 |
| | | Diprodine K-25 | — | — |
| | | Rondis FR | — | — |
| | | Pinecrystal KR-85 | — | — |
| | Solvent | Purified water | 120 | 120 |
| | Dispersant | Rapisol A-90 | 0.3 | 0.3 |
| | | Nopco 38C | 0 | 0 |
| | | Lavelin FD-40 | 0 | 0 |
| | Polymerization inhibitor | Diethylhydroxylamine | 0.08 | 0.08 |
| | Phenol-based antioxidant | Antage HP-400 | 0.06 | 0.06 |
| | | Nocrack NS-5 | — | — |
| | Ultraviolet absorbent | Tinuvin 326 | 0 | 0 |
| | | Tinuvin 328 | 0 | 0 |
| | Photostabilizer | Tinuvin 770 | 0 | 0 |
| | | Tinuvin 144 | 0 | 0 |

TABLE 4-continued

|   |   |   | Comparative Example | |
|---|---|---|---|---|
|   |   |   | 2 | 3 |
| Polymerization condition |   | Polymerization temperature (° C.) | 10 | 10 |
|   |   | Polymerization rate (%) | 70 | 70 |
| Evaluation | Chloroprene rubber composition | Color b value (−) | 4.3 | No polymerization reaction occurred. |
|   |   | Discoloration resistance | X |   |
|   | Adhesive composition | Color tone | X |   |
|   |   | Tackiness | ○ |   |
|   |   | Initial adhesive strength (3 hours) N/mm | 0.45 |   |
|   |   | Adhesive strength in the normal state (10 days) N/mm | 0.7 |   |

As shown in Tables 2 and 3, the adhesive compositions prepared in Examples 12 to 29 show a pale color tone without deterioration in tackiness and initial and normal-state strength and were superior in discoloration resistance under heat or light, compared to those of the Comparative Examples.

In regard to the blending amount of the rosin acid salt, there was no polymerization reaction observed in Comparative Example 3 wherein the blending amount of the rosin acid salt is less than 0.5 parts by mass. In contrast in Comparative Example 2 wherein the blending amount of the rosin acid salt is more than 7.0 parts by mass, the adhesive composition was lower in discoloration resistance under heat or light and the graft-type adhesive thereof was also unfavorable, as it had a dark brown color tone.

In regard to the Gardner color scale of the rosin acid salts of Examples, it was found that the graft adhesive of Example 14, wherein a rosin acid salt having a Gardner color scale of 4 or less was used, has a particularly favorable color tone.

In regard to the Hazen scale of the rosin acid salts of Examples, the graft adhesive of Example 15, wherein a rosin acid salt having a Hazen scale of 200 or less was used, has a particularly favorable color tone.

The results above demonstrate that it is important to specify the emulsifier and also the blending amount of it in a very narrow range, to make the chloroprene rubber composition and the adhesive using the same have favorable discoloration resistance under heat or light.

Industrial Applicability

The chloroprene rubber composition according to the present invention is very superior in discoloration resistance under heat or light. It can be used favorable in adhesive compositions for various materials, because of the properties. For example, it can be used for bonding or adhesion of a wide variety of materials including papers, woods, cloths, natural leathers, shoe materials, jerseys, synthetic leathers, rubbers, plastics, foams, ceramics, glasses, mortars, cement-based materials, synthetic ceramics, metals, and others.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A chloroprene rubber composition, prepared by carrying out emulsion polymerization of a total 100 parts by mass of monomers at least containing chloroprene in the presence of 0.5 to 7.0 parts by mass of a rosin acid salt as emulsifier and terminating the emulsion polymerization by addition of a polymerization inhibitor and 0.005 to 0.5 parts by mass of a phosphorus-based compound and 0.01 to 1.0 parts by mass of phenol-based compound as antioxidant,
wherein the content ratio of the phenol-and phosphorus-based compounds, phenol-based compound:phosphorus-based compound, is 0.5 to 5:1.

2. The chloroprene rubber composition according to claim 1, wherein the phosphorus-based compound is at least one phosphorus-based compound selected from 2,2'-methylenebis(4,6-di-butylphenyl)octyl phosphite, 3,9-bis(2,6-di-tert-butyl-4-methylphenoxy)-2,4,8,10-tetraoxa-3,9-diphosphaspiro[5.5]undecane, tris(2,4-di-tertbutylphenyl) phosphite, bis(2,4-di-t-butylphenyl)pentaerythritol diphosphite, and 6-[3-(3-t-butyl-hydroxy-5-methylphenyl)propoxy]-2,4,8,10-tetra-t-butylbenzo[d, f][1,3,2]dioxaphosphepin.

3. The chloroprene rubber composition according to claim 1, wherein the phenol-based compound is at least one phenol-based compound selected from 2,2'-methylenebis(4-ethyl-6 tert-butylphenol), 2,2'-methylenebis(4-methyl-6 tert-butylphenol), pentaerythritol tetrakis[3-(3,5-di-t-butyl-4-hydroxyphenyl)propionate)], octadecyl 3-(3,5-di-t-butyl-4-hydroxyphenyl)propionate), ethylenebis(oxyethylene)bis[3-(3, 5-t-butyl-4-hydroxy-m-tolylpropionate)], and 2-methyl-4,6-bisoctylthiomethyl-phenol.

4. The chloroprene rubber composition according to claim 1, wherein a surfactant having two kinds of hydrophilic anion groups is used as dispersant during the emulsion polymerization.

5. The chloroprene rubber composition according to claim 4, wherein the surfactant is an alkyl sulfosuccinic acid salt and/or a sulfated fatty acid salt.

6. The chloroprene rubber composition according to claim 1, wherein a water-soluble initiator is used during the emulsion polymerization.

7. The chloroprene rubber composition according to claim 6, wherein at least one promoter selected from sodium sulfite, potassium sulfite, sodium bisulfite, formamidinesulfinic acid, potassium pyrosulfite, and sodium hydrosulfite is used during the emulsion polymerization.

8. The chloroprene rubber composition according to claim 1, wherein the rosin acid salt has a Gardner color scale of 4 or less.

9. The chloroprene rubber composition according to claim 1, wherein the rosin acid salt has a Hazen scale of 200 or less.

10. The chloroprene rubber composition according to claim 1, further comprising a benzotriazole-based ultraviolet absorbent as ultraviolet absorbent.

11. The chloroprene rubber composition according to claim 1, further comprising a hindered amine-based photostabilizer as photostabilizer.

12. The chloroprene rubber composition according to claim 1, wherein the chloroprene rubber is a graft polymer of 2-chloro-1,3-butadiene and an acrylic monomer.

13. The chloroprene rubber composition according to claim 12, wherein the acrylic monomer is methyl methacrylate.

14. An adhesive composition, at least comprising the chloroprene rubber composition according to claim 1 and an organic solvent.

\* \* \* \* \*